United States Patent
Challener et al.

(10) Patent No.: US 7,620,997 B2
(45) Date of Patent: Nov. 17, 2009

(54) SYSTEM AND METHOD FOR CONTROLLING NETWORK ACCESS IN WIRELESS ENVIRONMENT

(75) Inventors: David Carroll Challener, Raleigh, NC (US); Daryl Carvis Cromer, Apex, NC (US); Howard Jeffrey Locker, Cary, NC (US); Hernando Ovies, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1353 days.

(21) Appl. No.: 10/748,919

(22) Filed: Dec. 22, 2003

(65) Prior Publication Data

US 2005/0138424 A1   Jun. 23, 2005

(51) Int. Cl.
*G06F 7/04* (2006.01)
*G06F 15/16* (2006.01)
*G06F 17/30* (2006.01)

(52) U.S. Cl. .................. 726/29; 726/3; 726/4; 726/6; 726/7; 713/166; 380/247; 380/258; 709/225

(58) Field of Classification Search ............... 726/3–4, 726/6–7, 29; 380/247, 258; 709/225; 713/166
See application file for complete search history.

(56) References Cited

U.S. PATENT DOCUMENTS

| | | | | |
|---|---|---|---|---|
| 5,712,973 | A | 1/1998 | Dayan et al. | 395/186 |
| 6,119,230 | A | 9/2000 | Carter | 713/200 |
| 6,308,273 | B1 | 10/2001 | Goertzel et al. | 713/201 |
| 6,349,206 | B1 | 2/2002 | Reichelt et al. | 455/421 |
| 6,480,096 | B1 | 11/2002 | Gutman et al. | 340/5.31 |
| 2002/0104012 | A1 | 8/2002 | Xydis | 713/200 |
| 2002/0123325 | A1 | 9/2002 | Cooper | 455/411 |
| 2002/0154776 | A1* | 10/2002 | Sowa et al. | 380/247 |
| 2002/0157024 | A1* | 10/2002 | Yokote | 713/201 |
| 2002/0188865 | A1* | 12/2002 | Joseph et al. | 713/201 |
| 2002/0194500 | A1 | 12/2002 | Bajikar | 713/201 |
| 2003/0084287 | A1* | 5/2003 | Wang et al. | 713/168 |
| 2003/0093693 | A1 | 5/2003 | Blight et al. | 713/201 |
| 2003/0142641 | A1* | 7/2003 | Sumner et al. | 370/328 |

FOREIGN PATENT DOCUMENTS

EP   0993167 A1   4/2000

* cited by examiner

*Primary Examiner*—Michael J Simitoski
(74) *Attorney, Agent, or Firm*—John L. Rogitz

(57) ABSTRACT

When an authenticated wireless computer loses connectivity to a wireless access point of a network and roams to another access point, the wireless computer (e.g., a hypervisor in the computer) determines whether the new access point is authorized for secure communication and if so, releases access to secure data on the network through the new access point.

8 Claims, 2 Drawing Sheets

US 7,620,997 B2

SYSTEM AND METHOD FOR CONTROLLING NETWORK ACCESS IN WIRELESS ENVIRONMENT

FIELD OF THE INVENTION

The present invention relates generally to wireless network computers.

BACKGROUND OF THE INVENTION

Personal computers, including notebook computers, palm computers, etc. are becoming ever more mobile, and increasingly communicate with computer networks using wireless links. In this way, a computer user can be productive anywhere, creating a mobile, highly productive work force.

As recognized by the present invention, much work with a mobile computer that a user might undertake requires wireless communication with network resources that require security. Most computer access systems were developed in the context of stationary computers that used wired links such as Ethernet or Token Ring to communicate with a server, rendering access and security management of the stationary computers relatively simple. However, the problems with access are more complicated in the context of wireless links, because as recognized herein one wireless access point might provide for desired security while other wireless access points might not.

SUMMARY OF THE INVENTION

A method for communication between a mobile computer and a network that includes secure data includes determining that the mobile computer has lost connectivity to a first access point of the network, and when the mobile computer roams to a second access point of the network, determining whether the second access point is authorized for secure communication. If so, the method includes releasing access to secure data on the network through the second access point.

The method may be undertaken by the mobile computer, and in particular by a hypervisor in the mobile computer, or it may be undertaken by a network resource outside the mobile computer.

In another aspect, a mobile computer includes a processor and a wireless transceiver in communication with the processor. The processor executes logic that includes determining whether a predetermined communication hardware event has occurred. If a predetermined communication hardware event has occurred, the logic includes selectively configuring the computer in a non-secure mode, in which the computer cannot access secure data on the network.

In still another aspect, a system including a mobile computer and a network including secure data includes means for determining that the mobile computer has lost connectivity to a first access point of the network. Also, the system includes means for determining whether a second access point of the network to which the mobile computer has roamed is authorized for secure communication. Means are provided for permitting the mobile computer to access secure data on the network through the second access point.

In yet another aspect, a method for granting a mobile computer access to secure network resources based on an access point includes establishing communication between the computer and network through an access point. The method also includes, based on at least one of: a location, and an identification, of the access point, selectively granting the computer access to secure assets in the network. Thus, in the preferred embodiment of this aspect the computer is configured to access a first set of network assets when communicating through a first access point and a second set of network assets when communicating through a second access point.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
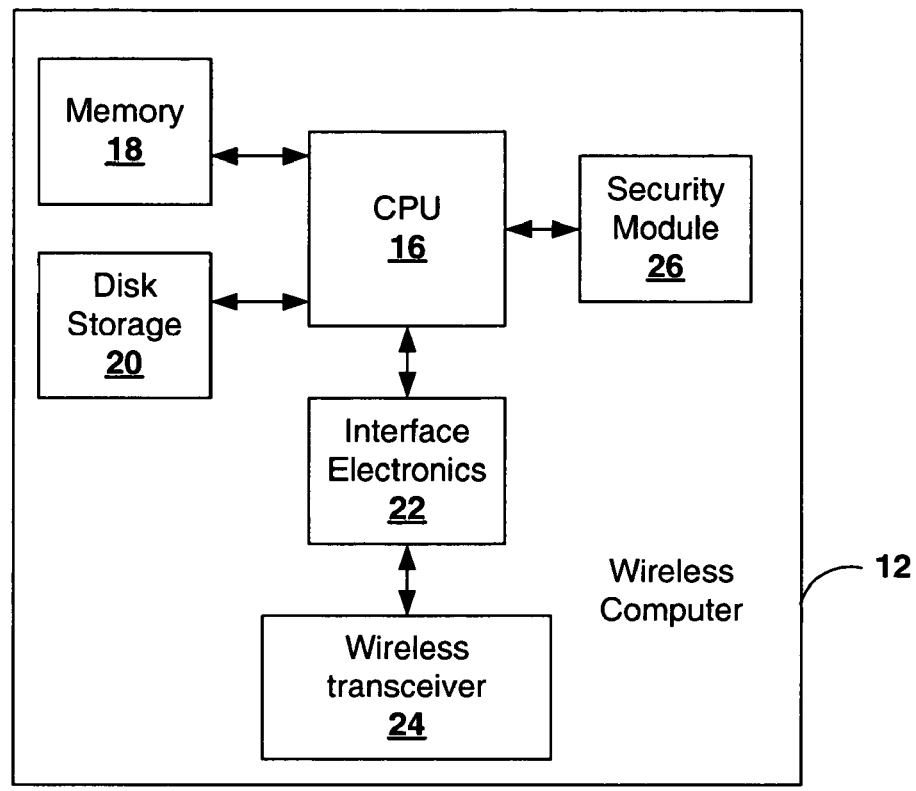
FIG. 1 is a block diagram of the present architecture.
Figure 1:
Figure 1:
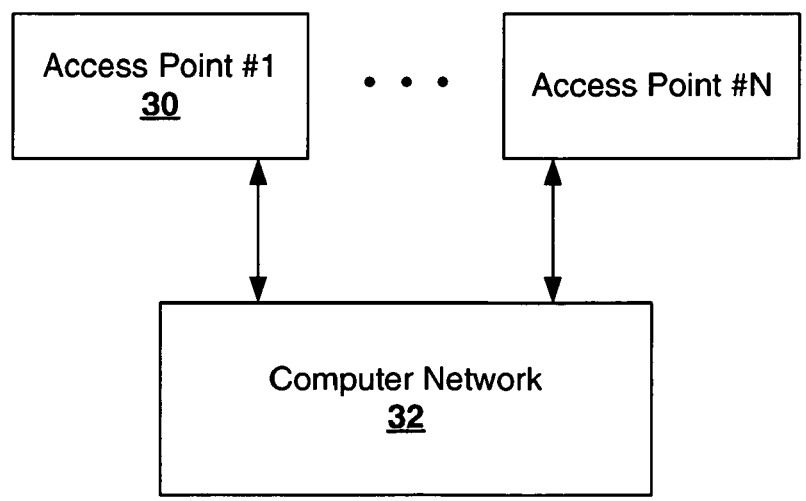

Referring initially to FIG. 1, a computing system is shown, generally designated 10, that includes plural mobile computers 12 (only a single mobile computer 12 shown for clarity). The mobile computer 12 can be any suitable computer, e.g., a personal computer or larger, a laptop computer, a notebook computer or smaller, etc.

As shown in FIG. 1, the preferred non-limiting mobile computer 12 includes a central processing unit (CPU) 16 that can communicate with a solid state memory 18 and with nonvolatile memory such as a disk storage 20, e.g., a hard disk drive 20. Also, the CPU 16 can communicate, using appropriate computer/wireless transceiver interface electronics 22, with a wireless transceiver 24, such as but not limited to a GSM or TDMA or CDMA transceiver, or a Wi-fi transceiver, Bluetooth transceiver, or Ricochet® transceiver or other type of wireless transceiver. Alternatively or in addition, the computer 12 can have a non-wireless communication port that a user can plug into a communication outlet.

Additionally, if desired the CPU 16 may communicate with a security module 26. In one embodiment, the security module 26 may be a so-called "hypervisor" that is a dedicated part of the CPU 16 chip. Or, the security module may be a separate processor, such as a trusted platform module (TPM).

As shown in FIG. 1, the mobile computer 12 can communicate, via a wireless link 28, with a first access point 30, such as but not limited to a local area network (LAN) access point or a wide area network (WAN) access point, e.g., a GSM or CDMA base station. As shown, plural access points are provided. The access points 30 communicate with a computer network 32, such as a secure company intranet or other network.

It is to be understood that in the preferred embodiment, the logic below is undertaken by the mobile computer 12, either by the CPU 16 or the security module 26 or both. Alternatively, however, the logic below may be undertaken by the network 32 itself.

Figure 2:
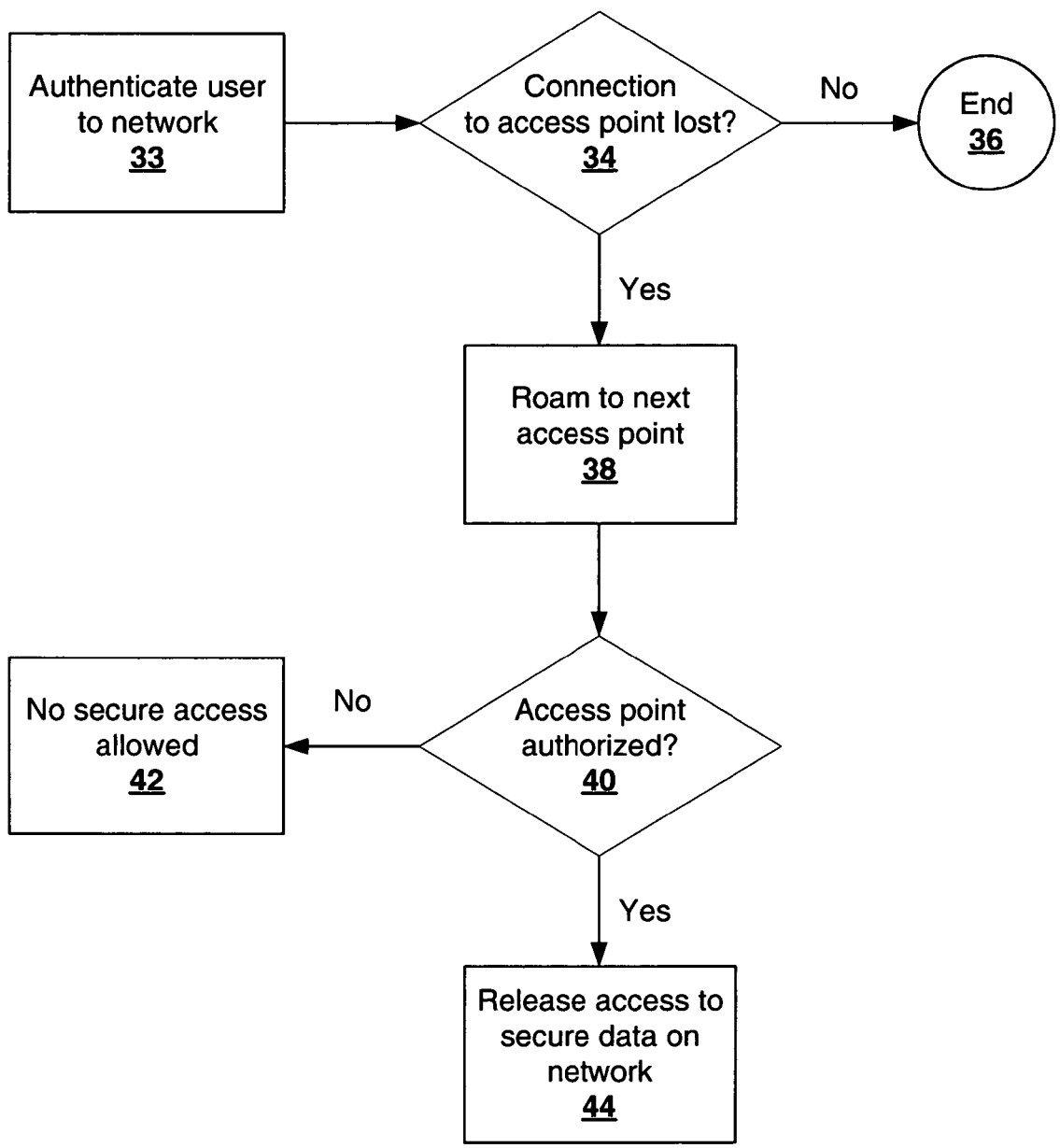
FIG. 2 is a flow chart of the presently preferred logic.

Now referring to FIG. 2, commencing at block 33 the mobile computer 12 communicates with a first access point 30. It is assumed that the user and/or the mobile computer 12 is authenticated through the first access point. Accordingly, the first access point is an authenticated access point. Under these conditions the mobile computer 12 roams, as shown at block 38, to the next may access network resources in accordance with its authentication.

Decision diamond 34 indicates that the relevant logic ends at state 36 if the mobile computer 12 remains in connectivity with the first wireless access point, but if connectivity is lost because, e.g., the mobile computer 12 moved, the transceiver 24 of the mobile computer 12 roams to the next available access point 30 in accordance with wireless communication principles known in the art. Such an event is an example of a hardware event.

At decision diamond 40, it is determined whether the new access point is an authorized access point for secure data communication with the network 32. This determination can be made by accessing a list or other data structure of authorized access points resident in the computer 12 to determine whether the particular access point is on the list (using the identity or location of the new access point), or it can be done by receiving a signal from the network 32 through the new access point 30 that the new access point is an authorized access point. The list can be updated periodically using the network described above.

If the new access point is not authorized for secure communication, the logic flows to block 42 to disallow secure data transfer through the access point. Essentially, block 42 indicates that if a predetermined communication hardware event has occurred such as loss of connectivity to a secure access point, the computer 12 is selectively configured in a non-secure mode (by, e.g., its hypervisor), wherein the computer 12 cannot access secure data on the network 32. On the other hand, if the new access point is authorized for secure communication, the logic flows to block 44 to allow secure data transfer through the access point, essentially by releasing access for the computer 12 to secure assets of the network 32.

According to present principles, different levels of secure network access may be granted to different access points. Thus, for instance, a computer might be allowed by its hypervisor to access some but not all secure data on the network 32 from a home access point, yet access all secure data on the network from an access point in a different location. Accordingly, the computer 12 may be configured to access a first set of network assets when communicating through a first access point 30 and a second set of network assets when communicating through a second access point 30.

While the particular SYSTEM AND METHOD FOR CONTROLLING NETWORK ACCESS IN WIRELESS ENVIRONMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A service comprising:
    determining that a mobile computer has lost connectivity to a first access point of a network;
    when the mobile computer roams to a second access point of the network, determining whether the second access point is authorized for first secure communication and if so,
    releasing access of the computer to first secure data on the network through the second access point, and otherwise releasing access of the computer to data other than the first secure data on the network through the second access point, wherein the mobile computer is authenticated at the first access point, prior to losing connectivity thereto, wherein releasing access to secure data on the network through the second access point comprises releasing access to a set of secure data which differs from the secure data released when the mobile computer is connected to the first access point.

2. The service of claim 1, wherein the service is undertaken by the mobile computer.

3. The service of claim 2, wherein the service is undertaken by a hypervisor in the mobile computer.

4. The service of claim 1, wherein the service is undertaken by at least one network resource outside the mobile computer.

5. A system including a mobile computer and a network including secure data, comprising:
    means for determining that the mobile computer has lost connectivity to a first access point of the network;
    means for determining whether a second access point of the network to which the mobile computer has roamed is authorized for secure communication; and
    means for permitting the mobile computer to access secure data on the network through the second access point if the second access point is authorized for secure communication, and otherwise granting access to the computer to data other than the secure data through the second access point, wherein the means are embodied by a hypervisor in the mobile computer.

6. The system of claim 5, wherein the mobile computer is authenticated at the first access point, prior to losing connectivity thereto.

7. A method comprising:
    establishing communication between a mobile computer and a network through an access point; and
    based on at least one of: a location, or an identification, of the access point, either granting the computer access to secure assets in the network or granting the computer access to other than the secure assets in the network, wherein the act of selectively granting is undertaken by a hypervisor in the mobile computer.

8. The method of claim 7, wherein the computer is configured to access a first set of network assets when communicating through a first access point and a second set of network assets when communicating through a second access point.

* * * * *

UNITED STATES PATENT AND TRADEMARK OFFICE
CERTIFICATE OF CORRECTION

PATENT NO. : 7,620,997 B2  
APPLICATION NO. : 10/748919  
DATED : November 17, 2009  
INVENTOR(S) : Challener et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1724 days.

Signed and Sealed this

Twenty-sixth Day of October, 2010

David J. Kappos
*Director of the United States Patent and Trademark Office*